United States Patent
Andersen et al.

(10) Patent No.: US 9,380,802 B2
(45) Date of Patent: Jul. 5, 2016

(54) COATED PET CHEW PRODUCT

(71) Applicant: Redbarn Pet Products, Inc., Long Beach, CA (US)

(72) Inventors: David A. Andersen, Long Beach, CA (US); Richard L. Harpe, Huntington Beach, CA (US); Steven B. Doerr, Topeka, KS (US)

(73) Assignee: Redbarn Pet Products, Inc., Long Beach, CA (US)

( * ) Notice: Subject to any disclaimer, the term of this patent is extended or adjusted under 35 U.S.C. 154(b) by 178 days.

(21) Appl. No.: 14/244,663

(22) Filed: Apr. 3, 2014

(65) Prior Publication Data

US 2015/0282504 A1    Oct. 8, 2015

(51) Int. Cl.
*A23K 1/10*     (2006.01)
*A23K 1/16*     (2006.01)
*A23K 1/00*     (2006.01)
*A23K 1/18*     (2006.01)

(52) U.S. Cl.
CPC .............. *A23K 1/106* (2013.01); *A23K 1/004* (2013.01); *A23K 1/16* (2013.01); *A23K 1/1603* (2013.01); *A23K 1/164* (2013.01); *A23K 1/1631* (2013.01); *A23K 1/1643* (2013.01); *A23K 1/1646* (2013.01); *A23K 1/1866* (2013.01)

(58) Field of Classification Search
CPC ....... A23K 1/1603; A23K 1/004; A23K 1/16; A23K 1/164; A23K 1/1631; A23K 1/1643; A23K 1/1646; A23K 1/1866
See application file for complete search history.

(56) References Cited

U.S. PATENT DOCUMENTS

| | | | |
|---|---|---|---|
| 3,119,691 A | | 1/1964 | Ludington |
| 3,276,880 A | * | 10/1966 | Torr ............ A23B 4/0056 426/59 |
| 3,578,461 A | | 5/1971 | Weeks et al. |
| 3,871,334 A | * | 3/1975 | Axelrod ............ A01K 15/026 119/710 |
| 3,930,031 A | | 12/1975 | Kealy |
| 4,229,488 A | | 10/1980 | Suggs et al. |
| 4,366,175 A | | 12/1982 | Brown et al. |
| 4,508,741 A | | 4/1985 | Corbett et al. |
| 4,822,626 A | | 4/1989 | Spanier et al. |
| 5,532,010 A | | 7/1996 | Spanier et al. |
| 2003/0215547 A1 | * | 11/2003 | Leyh, Jr. ............ A23K 1/004 426/98 |

\* cited by examiner

*Primary Examiner* — Chhaya Sayala
(74) *Attorney, Agent, or Firm* — Foley & Lardner LLP; Sunit Talapatra

(57) ABSTRACT

Disclosed herein are pet chews which include a chewable substrate with a palatable coating and methods for making them. The methods include contacting a chewable substrate with a palatable coating composition and drying the coated pet chew or pet food. The coating provides strong binding power, good adhesiveness, and improved palatability and imparts a unique aesthetic to the pet chew product.

7 Claims, 1 Drawing Sheet

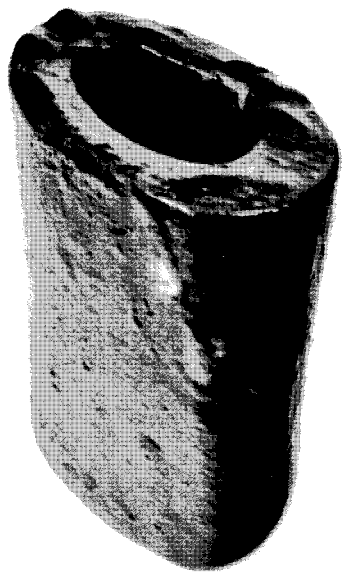

COATED PET CHEW PRODUCT

FIELD

The present technology relates in general to pet chew product with a highly palatable coating and methods for making and using the coated pet chew product.

BACKGROUND

The pet industry has provided a wide range of offerings of treat products for dogs over the years. These include synthetic products such as those composed of nylon, rubber, rope or other materials that can be manufactured into a shape of interest to the animal. For the most part this type is considered a non-consumable pet toy. Another type of product includes a consumable treat with a short chew-time such as for example, jerky style products, dog biscuits or extruded kibble pieces. Another alternative is a consumable chew with a long chew-time such as knotted or rolled rawhide products, dehydrated body parts or injected molded treats where an edible fraction is injected under heat and pressure into a three dimensional mold and then solidified and dehydrated.

Several attempts have been made for improving the palatability of pet chews to pets and consumer appeal of pet chews. Some pet food manufacturers have developed products having flavor or palatability enhancers which are applied to the surface of dry dog and cat foods to increase palatability. These products were produced primarily with chicken viscera fraction with other more flavorful meat fractions such as beef liver, chicken liver or mechanically deboned beef and pork fractions. U.S. Pat. No. 3,119,691, for example, discloses dry animal food capable of forming a gravy-containing mixture on addition of aqueous liquid wherein the mixture comprises a particulate mass of a gelatinized expanded farinaceous material and a layer of solid fat.

Enzymes have been utilized in the pet ingredient preparation field to liquefy meat product fractions for further processing into usable pet food or pet treat ingredients. U.S. Pat. No. 3,578,461 teaches the use of protease enzymes to liquefy poultry feathers for further use in an animal feed product. U.S. Pat. No. 3,930,031 disclosed a synergistic flavor enhancing coating for cat food compositions comprising citric and phosphoric acids. U.S. Pat. No. 4,229,488 discloses a process for coating biscuit type products with an emulsified liver fraction to produce a more palatable product and improved appearance of the end biscuit. U.S. Pat. No. 4,366,175 discloses biscuit or kibble products coated with glazed liver. U.S. Pat. No. 4,508,741 teaches a unique coating for biscuit type products which combined a mixture of a farinaceous material and a small amount of proteinaceous material to supply an improved flavor and a sheen to the surface of the biscuit. U.S. Pat. No. 4,822,626 by Nabisco Brands relates to a dog biscuit with a baked-on proteinaceous coating. Nabisco disclosed further advancement of the technology to produce coated baked canine biscuits in U.S. Pat. No. 5,532,010.

Several of the above-mentioned technologies relate to the use of coatings on pet food products. In recent years, there has been a significant increase in the interest in treats with an extended chew-time of hours and days compared to the chew time of seconds for biscuit or jerky style treats. The difficulty faced by researchers when dealing with long chew-time treats is that these products are non-porous and liquid based coatings will not penetrate or even pass by capillary action from the surface of the treat to the inside. Thus it is difficult to provide a mechanism where a portion of the coating matrix can penetrate the surface of a pet chew to provide for permanent attachment. This is especially observed for coatings on hard surfaces such as bones. To compound this problem, the surface of pet chew is often too greasy or oily to allow for firm attachment of a coating to the surface. Therefore, despite several different approaches to enhance palatability and appeal of pet chew products, there is still a need for improvement. The present invention thus contemplates a safe, palatable and long-lasting chew product which provides a pet chew product having improved palatability and consumption time.

SUMMARY

In one embodiment, a palatable, long-lasting pet chew is provided, wherein the pet chew which includes a chewable substrate with a palatable coating. The chewable substrate can be edible or non-edible. In some embodiments, the chewable substrate is edible and includes a dried animal body part. In some embodiments, the dried animal body part is selected from bones, horns, antlers or hooves obtained from animals. In some embodiments, the bones comprise femur bones, rib bones, or knuckle bones obtained from a bovine animal. In some embodiments, the femur bones are bleached.

In some embodiments, the palatable coating comprises palatable animal fraction. In some embodiments, the palatable coating comprises dried bull penis fraction.

In one embodiment, a palatable coating composition for coating a pet chew or pet food is provided. The coating composition includes comprising palatable animal fraction. In some embodiments, the composition comprises from about 5 to about 100 weight % of dried bull penis fraction. In some embodiments, the coating composition further includes food grade additives selected from thickening agents, heat setting agents, adhesion agents, vitamins, emulsifiers, binding agents, antioxidants, palatability enhancers, nutritional aids or mixtures thereof.

In one embodiment, a palatable coating composition for coating a pet chew or pet food is provided, wherein the coating composition includes about 5% to about 40% by weight of bull penis fraction, about 20% to about 60% by weight of beef liver, about 15% to about 25% by weight of corn syrup, and about 15% to about 25% by weight of liquid egg.

In one embodiment, a palatable coating composition for coating a pet chew or pet food is provided, wherein the coating composition includes about 2% to about 15% by weight of bully digest, about 40% to about 70% by weight of beef liver, about 15% to about 25% by weight of corn syrup, and about 5% to about 15% by weight of whole egg powder.

In another embodiment, making a coated pet chew or coated pet food is provided, wherein the method includes contacting a chewable substrate with a palatable coating composition and drying the coated pet chew or pet food; wherein the chewable substrate is selected from dried femur bones, beef knuckle bones, cattle horns, deer antler and cow hooves; and wherein the palatable coating composition comprises dried bull penis fraction.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE DRAWINGS

FIG. 1 is a photographic representation of one embodiment of the pet chew product wherein the dried bleached cattle bone is coated with a coating formulated from dried bull penis fractions.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). The description of the preferred embodiment as set forth herein, and as depicted in the drawings, is provided for illustrative purposes only.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The expression "comprising" means "including, but not limited to." Thus, other non-mentioned substances, additives, carriers, or steps may be present. Unless otherwise specified, "a" or "an" means one or more.

As used herein, the term "and/or" includes any and all combinations of one or more of the associated listed items.

Unless otherwise indicated, all numbers expressing quantities of ingredients, reaction conditions, and so forth, used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques. The term "about" when used before a numerical designation, e.g., temperature, time, amount, and concentration, including range, indicates approximations which may vary by (+) or (−) 10%, 5% or 1%.

As used herein, the term "animal" is used in a general sense and means a human or other animal including, without limitation, avian, bovine, canine, equine, feline, lupine, murine, ovine, and porcine animals, thus encompassing pets.

As used herein, a "pet" refers to a non-human domesticated animal or a companion animal including, without limitation, cats, dogs, mice, horses, birds, cows, rabbits, guinea pigs, ferrets, hamsters, chinchillas, gerbils, goats, sheep, donkeys, pigs, fish, and the like. In certain embodiments, the present invention concerns domestic pets such as dogs and cats. In some embodiments, the invention concerns dogs. However, although the present disclosure exemplifies dogs and cats, the invention can be adapted for use with other classes of pet animals.

"Pet chews" are products intended to be chewed by a pet for an extended period of time, being distinguished from "pet food" or "pet treats," which are consumed and digested in a relatively short period of time.

As used herein, the term "palatable" or "palatability" refers to the eating quality of chew products. For example, the palatable pet chew will likely have an agreeable or pleasant taste upon consumption and possess an appetizing appearance, odor and texture.

As used herein, the term "chewable substrate" refers to any animal or pet chew or pet food product adaptable to being coated by the coatings disclosed herein. Although some of the embodiments below are discussed with respect to a specific chewable substrates known to be used as pet chew products, suitable substrates can include, but are not limited to, any pet food, toy, treat, chew or pet related product known in the art. Exemplary chewable substrate includes, but is not limited to, dried animal body parts, synthetic dog bones, plastic chews, rubber chews, dog biscuits, synthetic and natural leather, dried fruits, dried vegetables, fish parts, and the like.

Dried bull penis fractions are commercially available in the form of dried sticks typically 6" to 30" in length and ¼" to 1.5" in diameter. They are highly palatable and yield a long chew-time, satisfying pets such as dogs for several hours, before it is totally consumed. These dried treat sticks are sold as "bully" sticks or "pizzle" sticks. The commercial product is however typically not sold in lengths shorter than about 5" in length as in an un-chewed state a very short product could result in a choking hazard to dogs. Therefore a large fraction of "short" ends often remain from the manufacturing process. These "short" ends that can be utilized as "bull penis fraction" to produce a more palatable and more appealing pet chews, wherein a coating incorporating the fraction is applied to less palatable chew products to improve their taste, chew-time and palatability.

The present invention provides a new combination of ingredients and design which makes it possible to produce a chew product for pet consumption, which is palatable, long lasting, entertaining and can function as a dental hygiene product, a treat or toy.

Many long pet chew products available in the market, are simply not palatable as they have no meaty flavor fraction present in their substrate. Therefore, in one aspect, the present invention provides for techniques for utilizing the flavor provided by highly palatable products and incorporating them in to less palatable chewable substrates.

Thus, in one embodiment, a palatable, long-lasting pet chew is provided, wherein the pet chew includes a chewable substrate with a long-lasting, palatable coating. The chewable substrate includes both edible and non-edible materials.

The chewable substrate is, in one embodiment, made from edible raw materials. Suitable edible raw materials used to make the chewable substrate or matrix include, but are not limited to, dried or cured animal body parts such as bones, hooves, snouts, ears, tripe, esophagus, horns, antlers, tendons, and knuckles; dried or cured animal meat, chicken, pork, beef, duck, goose, turkey, poultry meat, fish, animal skin or hide; dried fruit; and dried vegetable such as carrot, sweet potato, potato, and the like. In certain embodiments, the chewable substrate comprises formulated chews produced by extrusion or injection molding. In certain embodiments, the chewable substrate comprises edible materials obtained from a bovine or from other animals. In some embodiments, the chewable substrate is composed of dried animal body parts such as such as dried cattle bones, cattle rib bones, cattle hooves and horns or deer & elk antlers. In some embodiments, the dried animal body part is selected from bones, horns, antlers or hooves obtained from animals. In some embodiments, the substrate comprises hard materials such as bones, wood, nylon, or polyurethane and the like. In some embodiments, the substrate comprises animal bones. In some embodiments, the bones comprise femur bones, rib bones, or knuckle bones obtained from a bovine animal. The bones can be bleached or unbleached. In some embodiments, the bones are femur bones which are bleached.

Non-edible materials used for pet chews are known in the art and include, but are not limited to, synthetic dog bones, plastic chews, rubber chews, synthetic and natural leather, ropes and the like.

In some embodiments, the substrate comprises hard materials such as bones, wood, nylon, or polyurethane and the like. Materials such as bones which have a hard and smooth surface are challenging to coat because the coatings have a difficult time adhering strongly. The present technology is advantageous in that even difficult to coat surfaces can be effectively coated in such a way that the coating has strong adhesion long after use and does not peel or fall off easily.

The palatable coating of the pet chew comprises a palatable animal fraction. The palatable animal fraction may include, but is not limited to, penis obtained from bovine animals, including, but not limited to hull, steer, cow, buffalo, bison, ox and the like or from other animals, such as the deer, elk, or even other deceased animals, or even animals that are legally hunted in the wild. In some embodiments, the palatable coating includes dried bull penis fraction.

The bull penis fraction can be obtained commercially or produced from bull penis which is typically about 25-35 inches in length and between 0.5 and 1.5 inches in diameter. The size is related to the age of the animal with full grown bulls yielding the larger size penis and smaller size steer penis being shorter and smaller in diameter. To produce the commercial product, the wet bull penis is dried from a starting moisture level of approximately 74% moisture to a final moisture level of approximately 5 to 10%. The sticks are then cut into different sizes such as 6", 9", 12", 18" and even 30". As a result of this sizing step, a large quantity of short ends of less than 5" remains as scrap material. These short ends can be utilized as bull penis fractions in the pet chew.

The bull penis fraction can be incorporated into the palatable coating compositions in the form of dried bull penis powder, emulsified bull penis or a bully digest. The bully digest may be prepared by enzymatically treating the bull penis fraction.

In one aspect, palatable coating compositions for coating the chewable matrix are provided. The palatable coating composition includes a palatable animal fraction. In some embodiments, the palatable animal fraction includes bull penis fraction. The bull penis fraction can be incorporated in the pet chew product at a concentration in the range of about 1 wt %, about 2 wt %, about 5 wt %, about 10 wt %, about 20 wt %, about 30 wt %, about 40 wt %, about 50 wt %, about 60 wt %, about 70 wt %, about 80 wt %, about 90 wt %, about 100 and ranges between any two of these values or less than any one of these values. In some embodiments, the palatable coating compositions includes from about 5 to about 100 weight % of dried bull penis fraction. In some embodiments, the palatable coating compositions includes from about 5 to about 40 weight % of dried bull penis fraction. In some embodiments, the palatable coating compositions includes from about 10 to about 30 weight % of dried bull penis fraction.

In some embodiments the bull penis fraction is converted to a bully digest and the digest is included in the coating compositions. The bully digest can be prepared using various methods known in the art. In one embodiment, the bully digest is prepared by enzymatically treating or digesting the bull penis fraction. The bully digest can be incorporated in the pet chew product at a concentration in the range of about 0.1 wt %, about 1 wt %, about 5 wt %, about 10 wt %, about 20 wt %, about 30 wt %, about 40 wt %, about 50 wt %, about 60 wt %, about 70 wt %, about 80 wt %, about 90 wt %, about 100 and ranges between any two of these values or less than any one of these values. In some embodiments, the palatable coating compositions includes from about 0.1 to about 100 wt % of bully digest. In some embodiments, the palatable coating compositions includes from about 1 to about 40 weight % of bully digest. In some embodiments, the palatable coating compositions includes from about 2 to about 15 weight % of bully digest.

In some embodiments, the palatable coating composition further includes additives. Suitable additives are known in the art and include food grade or generally recognized as safe ("GRAS") by the United States Food and Drug Administration, including, but not limited to, thickening agents, heat setting agents, adhesion agents, vitamins, emulsifiers, binding agents, antioxidants, adhesion promoters, preservatives, nutrients, humectants, odor enhancers, acids (e.g., citric acid, malic acid, fumaric acid), antioxidants (e.g., ascorbic acid, ascorbyl palmitate, tocopherols), flavorings, texturizers, vitamins, minerals, fibers, insoluble fibers, gums (e.g., xanthan), starches, cellulose, buffers, colorants, emulsifiers (e.g., lecithin, polyethylene glycol, polyoxyethylene sorbitan monooleate), sorbitol, alcohols, spices, syrups, milk, milk powder, dispersants, stabilizers, solubilizing agents, palatability enhancers (8P enhancers for dogs and 9P or 9M for cats sold by SPF Diana (France)), and the like, or mixtures thereof. These additives, if present, can be incorporated in the pet chew product at a concentration in the range of about 0.001 wt %, about 0.01 wt %, about 0.02 wt %, about 0.05 wt %, about 0.1 wt %, about 0.5 wt %, about 1.0 wt %, about 2 wt %, about 5 wt %, about 10.0 wt %, about 15.0 wt %, about 20.0 wt %, about 30.0 wt %, about 40.0 wt %, about 50.0 wt %, about 60.0 wt %, about 70.0 wt %, and ranges between any two of these values or less than any one of these values.

In some embodiments, the coating composition includes a thickening agent. Suitable thickening agents are known in the art and include, but are not limited to cellulose gum, starch, gum, fatty acid, fatty alcohol, hydrophilic colloidal particles, glycols, pectin, gelatin, and the like or combinations thereof. Suitable thickening agent includes, but is not limited to a natural gum derivative such as xanthan gum, tragacanth, gum acacia, or locust bean gum, or a synthetic cellulose-based gum or its derivative such as hydroxymethyl cellulose, hydroxypropyl cellulose, methyl cellulose or carboxymethyl cellulose, glycols, fatty acids or alcohols, starch. In some embodiments, the thickening agent is selected from cellulose gum, starch, gum, fatty acid, fatty alcohol, hydrophilic colloidal particles, polyoxyethylene glycol, polyoxyethylene glycol derivatives, and the like or combinations thereof. In some embodiments the thickening agent includes natural and synthetic gums such as CMC (carboxymethylcellulose).

In some embodiments, the coating composition includes an adhesion agent. Suitable adhesion agents are known in the art and include, but are not limited to corn syrup, corn syrup solids, maltodextrins, gelatin, casein, blood plasma, glycerol, sucrose, sorbitol, corn syrup, high fructose corn syrup, honey, agave syrup, rice syrup, maple syrup, and the like or combinations thereof. In some embodiments, the adhesion agent includes corn syrup. Corn syrups can be classified on the basis of D.E. values. The term D.E. is used herein to refer to the reducing sugars content of the dissolved solids in starch hydrolysates expressed as percent dextrose, measured by suitable methods known in the art. In some embodiments, the corn syrup for use in the present technology has a D.E. value of from about 20 to about 100. In some embodiments, the D.E. value is from about 42 to about 70. In some embodiments, the D.E. value is from about 50 to about 65. In some embodiments, the D.E. value is about 62. It is hypothesized that the use of corn syrup allows the coating to adhere to the substrate, improves palatability and imparts a glossy finish to the coating, thereby improving its aesthetic appeal of the pet chew. The amount of corn syrup in the coating compositions is at least an amount sufficient to improve the adhesion of the coating to the substrate. For example, the corn syrup is from about 0% to about 50% by wt, about 5% to about 40% by weight, about 10% to about 30% by weight, about 15% to about 25% by weight or about 18% to about 25% by weight of the total composition, and ranges between any two of these values or less than any one of these values. In some embodiments, the corn syrup is present from about 20 to 22 percent by weight of the coating composition.

In some embodiments, the coating composition includes a heat setting agent. Suitable heat setting agents are known in the art and include, but are not limited to liquid egg, whole egg powder, emulsified beef liver, emulsified poultry liver, pork liver and the like or combinations thereof. In some embodiments, the heat setting agent includes beef liver. In some embodiments, the heat setting agent includes liquid egg. In some embodiments, the heat setting agent includes egg powder. The heat setting agent can help in improving the adherence of the coatings onto the substrate, improve palatability and improve aesthetic appeal of the pet chew. The amount of heat setting agent in the coating compositions is at least an amount sufficient to improve the adhesion of the coating to the substrate. For example, the heat setting agent is from about 0% to about 80% by weight, about 10% to about 75% by weight, about 20% to about 70% by weight, about 30% to about 65% by weight or about 40% to about 50% by weight of the total composition, and ranges between any two of these values or less than any one of these values. In some embodiments, the heat setting agent is present from about 5 to 10 percent by weight of the coating composition. In some embodiments, the heat setting agent is present from about 20 to 70 percent by weight of the coating composition.

In some embodiments, the coating composition includes an emulsifier. Suitable emulsifiers are known in the art and include, but are not limited to lecithin, soy lecithin, glycerol, egg yolk, mono and diglycerides, polysorbates, propylene glycol monostearate, sorbitan monostearate, triglycerole monostearate, octaglycerol monoleateglyceryl monostearate, Tween 60, Tween 80, Tween 20, sodium or potassium phosphates, and the like or combinations thereof. In some embodiments, the emulsifier includes lecithin. In other embodiments, the emulsifier includes Tween 60. The coating composition may contain one or more emulsifiers in the amount of about 0.001 wt %, about 0.01 wt %, about 0.05 wt %, about 0.1 wt %, about 0.5 wt %, about 1.0 wt %, about 5.0 wt %, about 10.0 wt %, about 20.0 wt %, 30.0 wt %, about 40.0 wt %, about 50.0 wt %, and ranges between and including any two of these values or less than any one of these values. In some embodiments, the coating composition includes an emulsifier in an amount of about 0.01 to about 0.5 wt % of the coating composition. In another embodiment, the coating composition includes emulsifier in an amount of about 0.1 to about 0.2 percent by weight of the coating composition.

In some embodiments, the coating composition includes an antioxidant. Suitable antioxidants are known in the art and include, but are not limited to tocopherols such as $\alpha$-, $\rho$-, $\gamma$- and $\delta$-tocopherol, citric acid, ascorbic acid, sodium or calcium ascorbate, citrus oils, fumaric acid, malic acid, sodium ascorbyl palmitate, butylated hydroxyanisol (BHA), butylated hydroxytoluene (BHT), and tertiary butyl hydroquinone (TBHQ), rosemary extract, flax seed or oil, propyl gallate and other food grade antioxidants or combinations thereof. In some embodiments, the antioxidant includes tocopherol. The coating composition may contain one or more antioxidants in the amount of about 0.001 wt %, about 0.01 wt %, about 0.05 wt %. about 0.1 wt %, about 0.5 wt %, about 1.0 wt %, about 5.0 wt %, about 10.0 wt %, about 20.0 wt %, 30.0 wt %, about 40.0 wt %. about 50.0 wt %, and ranges between and including any two of these values or less than any one of these values. In some embodiments, the coating composition includes antioxidant in an amount of about 0.01 to about 0.5 percent by weight of the coating composition. In another embodiment, the coating composition includes antioxidant in an amount of about 0.05 to about 0.15 percent by weight of the coating composition.

The preservatives utilized in the present methods include any suitable preservatives known in the art, including food grade preservatives. The preservatives may function as mold inhibitors or antioxidants. Suitable preservatives include, but are not limited to, sodium benzoate, calcium benzoate, potassium benzoate, potassium sorbate, sodium sorbate, calcium sorbate, sodium acetate, calcium acetate, sodium diacetate, calcium diacetate, sodium propionate, calcium propionate, potassium propionate, citric acid, sorbic acid, ascorbic acid, propionic acid, paraaminobenzoic acid esters (parabens) and the like or mixtures thereof. These preservatives may be used to preserve the cleaned raw material or strips of raw material prior to forming the pet chew product. The coating compositions may contain one or more preservatives in the amount of about 0.001 wt %, about 0.01 wt %, about 0.05 wt %, about 0.1 wt %, about 0.5 wt %, about 1.0 wt %, about 5.0 wt %, about 10.0 wt %, about 20.0 wt %, 30.0 wt %, about 40.0 wt %, about 50.0 wt %, and ranges between and including any two of these values or less than any one of these values. In some embodiments, the coating composition includes preservative in an amount of about 0.01 wt % to about 0.1 wt %. In another embodiment, the coating composition includes preservative in an amount of about 0.1 wt % to about 0.5 wt %.

In some embodiments, the pet chew product may include a nutrient such as vitamins, minerals, enzymes, phytonutrients, animal fats, lecithin, chicken cartilage, chondroitin, fruits with antioxidant and other benefits (e.g., blueberries, cranberries) and the like or mixtures thereof.

In some embodiments, the pet chew product may include a suitable humectant known in the art, including, but are not limited to, glycerin, corn syrup, betaine, propylene glycol, sugar, high fructose corn syrup, honey, glycerol, sorbitol, xylitol, maltitol, whey, propylene glycol, dextrose, corn syrup solids, fructose, aloe vera, and the like, and mixtures thereof.

In one aspect, a palatable coating composition for coating a pet chew or pet food is provided, wherein the composition includes about 5% to about 40% by weight of bull penis fraction, about 20% to about 60% by weight of beef liver, about 15% to about 25% by weight of corn syrup, and about 15% to about 25% by weight of liquid egg. In some embodiments, a pet chew comprising a chewable substrate coated with a of the palatable coating as described herein is provided.

In another aspect, palatable coating composition for coating a pet chew or pet food is provided, wherein the composition includes about 2% to about 15% by weight of bully digest, about 40% to about 70% by weight of beef liver, about 15% to about 25% by weight of corn syrup, and about 5% to about 15% by weight of whole egg powder; wherein the bully digest comprises enzymatically treated bull penis fraction. In some embodiments, a pet chew comprising a chewable substrate coated with a of the palatable coating as described herein is provided.

Suitable enzymes for treating and breaking down the bull penis fraction include, but are not limited to proteolytic enzymes such as papain, bromelain, ficin, chymopapain, fungal and bacterial proteases, and the like or combinations thereof.

Thus in one aspect, the invention provides a pet chew composed of a dried or dehydrated cattle body part coated with a highly palatable coating containing palatable animal fractions along with other food grade ingredients to control coverage and provide for a firm attachment of said coating onto the surface of the said body part.

The coating provides strong binding power, good adhesiveness, improved palatability and imparts a unique aesthetic to the pet chew product. The coating described herein is distinct from other coatings known in the art in that the coating has enhanced binding ability to the chew, is easily applicable, and provides an even coating which improved the adhesion and palatability of the coated product. The thickness of the coating can be adjusted to improve palatability, chew time and aesthetic appeal. The coated chew is appealing to a pet owing to the palatability and the longevity of its chew time. Unlike other coated pet chews, the coatings described herein have strong adhesion, and long after use, and do not peel or fall off easily.

In one aspect, a method of making a coated pet chew or coated pet food is provided. The method includes contacting a chewable substrate with a palatable coating composition and drying the coated pet chew or pet food.

Suitable chewable substrate materials and palatable coating compositions are as described herein. In some embodiments, the chewable substrate includes dried animal body parts such as dried femur bones, beef knuckle bones, cattle horns, deer antler and cow hooves. In some embodiments, the substrate comprises hard materials such as bones, wood, nylon, or polyurethane and the like. In some embodiments, the chewable material is animal bone. In some embodiments, the palatable coating composition comprises dried bull penis fraction.

In some embodiments, the animal fraction is appropriately sized so as to achieve a smooth and homogeneous coating on the surface of the substrate. Suitable methods known in the art can be utilized to size the palatable animal fraction prior to incorporating it in to the coating. For example, in one embodiment the palatable animal fraction is ground to a suitable particle size using a suitable milling and/or homogenizing equipment such as a hammer mill or micro-pulverizer grinder. The powdered product is then incorporated into an aqueous system where the mixture is treated with proteolytic enzymes to produce a soluble form of the palatable animal fraction in the form of a coating solution or emulsion. In another embodiment, the palatable animal fractions are ground using suitable equipment to achieve a very fine powder having a low particle size, e.g., about 50 to about 500 mesh, about 75 to about 300 mesh or about 100 to about 200 mesh (75-150 microns) so that a suspension of the palatable animal fraction can be incorporated into a smooth and homogeneous coating. Suitable equipment for grinding the palatable animal fraction into a fine powder having suitable mesh size includes, but is not limited to, a ball mill, a hybridizer, a pin mill, a jet mill, a drum mill, an ultrasonic mill, an electromagnetic mill, an elliptical rotor mixer, a pearl mill or an attrition mill, hammer mill, fitz mill, "saw dust" from a band or circular saw cutting operation and the like. In some embodiments, the milling process can be repeated a few times to achieve the desired size.

The bull penis fraction can be incorporated into the palatable coating compositions in the form of dried bull penis powder, emulsified bull penis or a bully digest. The bully digest may be prepared by enzymatically treating the bull penis fraction.

In one embodiment, methods for preparing the bully digest used in the coating compositions, is provided. The method includes enzymatically treating or digesting bull penis fractions to obtain the bully digest. In some embodiments, the bull penis fractions are ground and added to an aqueous enzyme solution which is heated to a suitable temperature. The solution may then be agitated and held at a suitable temperature for a suitable period of time till the ground bully fraction is completely digested. The undigested portion can be removed by screening the solution on a mesh screen.

In another embodiment, the coating composition has sufficient viscosity so that a highly palatable and visually appealing concentration of penis flavored coating is deposited onto the substrate. In some embodiments, the viscosity can be suitably adjusted with the aid of additives such as e.g., a heat coagulatable ingredient; so that during the subsequent drying step the coating solution does not loose viscosity and result in a chew product with a reduced level of coating. In some embodiments the coating formulation can include an adhesion agent so that the coating does not easily flake off or chip off the substrate part during storage and commercial distribution. Better adhesion of the palatable coating also helps to maintain and hold the pet's interest for an extended chew period.

Once the palatable animal fractions have been reduced to a homogeneous solution or dry powder having a suitable particle size, they are incorporated in a solution such as an aqueous solution suitably along with additives such as a functional thickening agent, a heat setting component and an adhesion agent to form the final coating matrix. In addition, other components such as coloring agents, antioxidants, vitamins, minerals or nutritionally functional ingredients can be incorporated into this coating matrix. In addition to the palatable animal fractions, the coating compositions may further include additives known in the art and listed herein.

These additives may be added during the preparation and processing of the palatable animal fractions, during the preparation of the coating matrix or during or after the application of the coating on to the substrate to produce the final pet chew.

In some embodiments, the bully digest described herein is mixed with ground beef liver fraction and other ingredients at a suitable temperature. The resulting mixture may be processed through an emulsifier to produce a smooth emulsion. The resulting coating mixture can then be applied to the substrate using suitable methods known in the art. For example, the coating composition may be deposited into a dip tank with an over-under dual conveyor belt running through the coating. Suitable chewable substrates which have been cleaned, optionally bleached and cut into suitable length can then be placed onto the belt and run through the dip tank to apply a coating of the bully flavored digest. The substrates can be dried using suitable drying equipment to achieve desired moisture content and adhesion of the coating.

In another embodiment, fresh emulsified bull penis is utilized as the starting material. The meat fractions can be emulsified to obtain a fine emulsion and mixed with additives described herein e.g., whole liquid egg fraction, coloring, warmed corn syrup solution, emulsifiers, antioxidants and thickeners. The mixture is agitated at a suitable temperature to obtain the desired consistency and viscosity. Suitable substrates can then be dipped in the coating solution followed by drying and/or dehydration to obtain the finished product.

In yet another embodiment, short dried penis stick pieces are ground into a fine powder and a coating utilizing the ground fraction is formulated. The bull penis end pieces can be ground and screened or sieved to obtain a bully powder which is then blended with other ingredients and additives described herein. In some embodiments, the bully powder is blended with emulsified beef liver and other additives and agitated till a suitable viscosity is obtained. Suitable substrates can be submerged or dipped in the coating solution and dried and/or dehydrated to obtain the palatable pet chew product.

Suitable additives used in the above methods are described herein and include thickeners, heat settable agents, adhesion agents, emulsifiers, antioxidants, colorants and the like. These additives can be blended together or added one by one to the coating solution.

Numerous alternatives are known in the art for suitably thickening or diluting the coating to be applied to the substrate. The required ingredients are typically solubilized or suspended in water prior to the coating step. The viscosity of the coating can be controlled somewhat simply by formulating the mixture at a solids concentration level that will result in a viscosity to achieve sufficient coating adhering to the substrate.

The shape of the substrate being coated and the equipment being utilized will to some extent dictate the desired viscosity. In illustrative embodiments, the coating can have a viscosity in the range of about 2000 centipoise units to about 4000 centipoise units. Another alternative for achieving this desired viscosity is to utilize some ingredients that are naturally thick such as emulsified fresh meat fractions. Among other known thickeners, emulsified beef liver was found to work well for this function and it also acted to some extent as a heat settable ingredient to prevent the coating from draining off as it is heated in the final drying step. Other thickening agents such as natural or synthetic gums can be utilized to achieve the desired viscosity. Viscosity can also be controlled by the temperature of the ingredients, a lower temperature resulting in more viscous coating.

In one embodiment, the method further includes incorporating a heat settable agent or a heat setting agent into the coating composition. Liquid food systems without a heat settable agent will typically get thinner as they are heated. The final step following coating of the body part is to dehydrate the coated body part in dryer-ovens to a shelf stable moisture range between approximately 5% and 10% moisture. It is therefore necessary to prevent the coating from dripping off the body part during this drying step. This is achieved by incorporating a heat setting agent into the formulation. Such heat setting agents as liquid or dried eggs act as very good setting agents. Alternatively, emulsified meat slurry such as beef liver can be incorporated into the mix to heat set the coating. Another alternative would be to incorporate a level of heat settable protein such as wheat gluten or blood plasma.

In one embodiment, the method further includes incorporating an adhesion agent in the coating composition so that the dried coated matrix will adhere to the surface of the body part being utilized. Many dried body parts utilized in the pet treat market may be somewhat greasy on the surface or have a very smooth and non-penetratable surface that creates a risk of the bull penis coating not staying attached during the distribution cycle. Also, as the dog chews the product, it is preferred that the coating be difficult for the pet to remove thus creating a long chew-time for the pet treat. Providing a somewhat sticky component of the coating mix will assist in this adhesion step. One highly functional ingredient for this purpose is corn syrup. In some embodiments, a high DE corn syrup such as a 62DE liquid corn syrup serves as the adhesion agent. Other alternatives such as corn syrup solids, maltodextrins, gelatin, casein, blood plasma and a wide selection of natural and synthetic gums such as CMC (carboxymethylcellulose) can serve this function in the coating formulation.

The coated pet chew is dried using suitable drying methods known in the art, e.g., air-drying, heat drying, vacuum drying, or combinations thereof. In some embodiments, the drying includes air drying the coated product. In some embodiments, the drying includes heat drying the coated product. Suitable air drying or heat drying methods are known in the art. In some embodiments, the coated product is dried by placing them on drying racks and placing them in a drying oven or truck dryer. In some embodiments, the coated pet chews are dried using a conveyer type dryer. In some embodiments, the coated pet chews are dried using a tunnel dryer. The drying process can be conducted at a suitable temperature for a sufficient period of time to ensure complete drying of the product. In some embodiments, the coated product is placed in a dryer or an oven and the product is dried for a suitable period of time at a suitable temperature. For example, the coated product can be dried for about 1 min to about 60 min, about 1 h to about 5 h, about 5 h to about 8 h, about 8 h to about 15 h, about 15 h to about 25 h, about 25 h to about 40 h, and ranges between and including any two of these values. In some embodiments, the coated product is dried for about 10 h to about 20 h. In some embodiments, the coated product is dried for about 15 h.

The dryer or other drying equipment used can be heated to a suitable temperature, e.g., at about 500° F. at about 400° F. or below, at about 380° F. or below, at about 350° F. or below, at about 300° F. or below, at about 250° F. or below, at about 200° F. or below, at about 150° F. or below, or at about 100° F. or below, and ranges between and including any two of these values. In one embodiment, the drier is heated to a temperature of about 150° F. to about 200° F. In some embodiments, the drier is heated to a temperature of about 350° F. to about 400° F. In one embodiment, the coated product is dried in a tunnel dryer at about 180° F. for about 3 h. In one embodiment, the coated product is dried on a conveyer dryer at about 375° F. for about 3-4 min.

The pet chew product can be dried under suitable conditions so as to obtain specific moisture content in the end product. In some embodiments, the pet chew product is dehydrated to a shelf-stable moisture level. For example, the product may be dehydrated to moisture content of about 5% or below, about 10% or below, about 15% or below, about 20% or below, about 25% or below, about 30% or below, or about 35% or below, and ranges between and including any two of these values. In some embodiments, the pet chew product is dehydrated to a moisture content of below 15%. In some embodiments, the pet chew product is dehydrated to a moisture content of below 12%. In some embodiments, the pet chew product is dehydrated to a moisture content of below 10%.

The present compositions and methods improve the adhesion of the coating composition onto the substrate to provide a long lasting, palatable, aesthetically appealing pet chew product. In some embodiments, the present methods improve the adhesion of the coating composition to the substrates. In some embodiments, the adherence of said composition to the substrate is improved as compared to analogous compositions not containing the components included in the compositions described herein. In some embodiments, the adherence of said composition to the substrate is improved as compared to analogous compositions not containing the heat setting agent and/or the adhesion agent. In some embodiments, the adherence of said composition to the substrate is improved as compared to an analogous compositions not prepared by the methods described herein.

In some embodiments, the adherence of said composition to the substrate is improved by about 1% to about 90%, about 2% to about 80%, about 5% to about 70%, about 10% to about 60%, about 15% to about 50%, about 20% to about 40%, about 25% to about 30%, and ranges between and including any two of these values, compared to analogous compositions not containing the components included in the compositions described herein and/or analogous compositions not prepared by the methods described herein. In some embodiments, the adherence of said composition to the substrate is improved by about 5% to about 15% compared to analogous compositions not containing the components included in the compositions described herein and/or analogous compositions not prepared by the methods described herein.

In some embodiments, a pet chew comprising a chewable substrate coated with any of the palatable coating as described herein is provided. The pet chews of the present technology have improved aesthetic appeal compared to other analogous products. In some embodiments, the pet chews are shinier and have a smooth surface. In some embodiments, the pet chews described herein have improved aesthetic appeal compared to analogous compositions not containing the components included in the compositions described herein and/or analogous compositions not prepared by the methods described herein. In some embodiments, the pet chews have improved palatability compared to analogous compositions not containing the components included in the compositions described herein and/or analogous compositions not prepared by the methods described herein.

In some embodiments, the method further includes packaging the pet chew using suitable packaging methods known in the art using suitable packaging materials. The packaged pet chew can be stored or transported for sale.

In one aspect, the technology provides a method wherein a coating of highly palatable animal penis fraction is coated onto the surface of a dried animal body part and a highly palatable pet chew product obtained by the said method. The methods and compositions described herein can be used to improve the palatability, physical appearance and consumer appeal of unpalatable dried or dehydrated body part products. The methods provide coating which have advantages such as strong binding power and improved adhesiveness when compared to other coated pet chew products.

In some embodiments, the method further includes packaging the pet chew product using suitable packaging methods known in the art using suitable packaging materials. As used herein, the term "packaging material" means any component of packaging in which pet chew product is contained. Packaging materials include, for example, thermoplastic packaging films and foils, and wrapping or bags formed therefrom; coated or uncoated paper webs and sheets as well as bags or cardboard boxes; thermoformed punnets; wax or film coatings applied directly to the product or to a container; multilayer packaging constructions; printed coatings, embossed indicia, labels placed on or in packaging or on product, adhesives used to close or seal packaging or adhere labels and the like thereto; ink printed directly on product, directly on packaging, or on a label that is then adhered to packaging. In some embodiments, the product is individually packed in plastic bags and then collectively packed in bulk boxes. The packaged product can be stored or transported for commercial distribution and sale.

The pet chew product is all natural, has excellent chew time and palatability. The uneven surface of the ball shaped product provides a chew which can be rolled, held between the teeth or chewed effectively. The pet chew product can be a source of nutrients, such as proteins, is non-allergic and retain their freshness, texture and taste over a long period of time. The pet chew product is designed to be fun and also has functional benefits as described above. The pet chew product can be marketed in the dry form, and does not require any expensive storage or transport conditions such as extensive chilling. The pet chew product is readily available for consumption and entertainment of pets such as dogs.

The pet chew product of the invention has a significantly longer chew time than comparable animal treats having different constitution. As a result, the chew product keeps the pet occupied for a long time because it takes an extended period for the pet to completely consume the chew. In some embodiments, the present pet chew product has a chew time that is about 1.5 times, about 2 times, about 3 times, about 5 times, about 7 times or about 10 times more than the comparable pet chew products known in the art, such as e.g., a solid pet chew, a molded pet chew, an extruded pet chew and the like.

In one embodiment, a shelf-stable pet chew product obtained using the methods described herein is provided. A product has shelf stability when it is safe for consumption and maintains an acceptable quality when stored at room temperature. Some of the factors which contribute to the deterioration of foods include microbial, enzymatic, chemical and physical factors. The pet chew product of the present invention is stable against all these factors. In some embodiments, the pet chew product is more stable than other pet chew products known in the art.

In some embodiments, the pet chew product maintains its integrity and natural characteristics over a long period of time and is resistant to degradation and decay. In one embodiment, the pet chew product retains about 80%, about 90% or about 100% of the initial dimensions over a period of about 24-36 months. In some embodiments, the pet chew product retains the dimensionally stable indefinitely. In some embodiments, the pet chew product remains resistant to degradation and decay for over 12 months. In some embodiments, the pet chew product remains resistant to degradation and decay for over 24 months. In some embodiments, the pet chew product remains resistant to degradation and decay for over 36 months. In some embodiments, the pet chew product remains resistant to degradation and decay for over 60 months.

The present invention, thus generally described, will be understood more readily by reference to the following examples, which are provided by way of illustration and are not intended to be limiting of the present invention. The examples are intended to illustrate the various embodiments of the present technology.

EXAMPLES

The following examples are set forth as illustrative of this invention:

Example 1

A bull penis digest was produced from the short end cuts of dehydrated bull penis sticks. The product was made in a 125 gallon steam jacketed kettle. 60 gallons of water (500#) was added to the kettle. The water was heated to between 130 and 135° F. 908 g papain and 908 g bromolein was solubilized in the warm water. A total of 166 pounds (about 75 kg) of the ground bull penis end cuts was added to the kettle. The product was agitated continuously for 45 min with additional steam being added to maintain a temperature between 130 and 135° F. After the 45 min holding period, the temperature of the mixture was increased to 170° F. to inactivate any remaining enzyme. The mixture was then screened on a Sweeco 12 mesh screen to remove any undigested portion of the ground bully end cuts. This "bully digest" was then utilized to produce the following coating:

A coating was produced with the following formulation:

| Ingredient | % |
|---|---|
| Beef Liver | 66.55 |
| 62 DE Corn Syrup | 21.00 |
| Whole Egg Powder | 7.00 |
| Bully Digest | 5.00 |
| Lecithin | 0.20 |
| Carmel Color | 0.15 |
| Mixed Tocopherol | 0.10 |

The beef liver fraction was ground and the above ingredients were mixed together at a temperature below 70° F. and processed through a Carl Snell Emulsifier to produce a smooth emulsion. The mixture was then deposited into a dip tank with an over-under dual conveyor belt running through the coating. Beef cattle bones that had been cleaned, bleached, dried and cut into 3" lengths were then run through the dip tank to apply a coating of the bully flavored digest to the surface of the bones. The coating represented about 12% by weight coverage on the surface of the bones when wet and about 6% by weight coverage when dry. The finished coating had a viscosity of 3,500 centipoise units. The bones were then placed on dryer racks and were heated to 180° F. in a truck dryer to heat-set the coating and dehydrate the coated bones to below 10% moisture. The final product was tested and found to be highly palatable to dogs and the coating was difficult for the dogs to get off which resulted in a very long chew-time for the final product.

Example 2

Another alternative for producing a desired end product of this teaching is to utilize fresh emulsified bull penis as the starting material rather than to utilize the end piece scrap from a bull pizzle drying and sizing operation. The formulation below was produced to demonstrate this variation:

| Ingredient | % |
|---|---|
| Emulsified Beef Penis | 30.0 |
| Beef Liver | 25.3 |
| 62 DE Corn Syrup | 22.0 |
| Liquid Egg | 22.0 |
| Tween 60 Emulsifier | 0.2 |
| Carmel Color | 0.15 |
| Tocopherol | 0.10 |
| CMC 7HF Cellulose gum | 0.25 |

The meat fractions were emulsified in a Hobart Bowl Chopper into a fine emulsion. They were then added to a whole liquid egg fraction in an agitated blender. The coloring and warmed corn syrup solution was added followed by the emulsifier and the antioxidant. The CMC7HF cellulose gum was then added to thicken the coating solution to approximately 3200 centipoise units. Dried bleached femur bones of 6" length were dipped in the coating solution with a pick-up of 12 to 15% by weight coating. The bones were then passed down a conveyor dryer set at 375° F. with a retention time of 3.5 minutes. This heat-set the egg and fresh meat fractions. The bones were further dehydrated in a tunnel dryer at 180° F. for 3 hours. The final bones had a thick bull penis flavored coating which was highly palatable to dogs and was firmly attached to the bone fraction which resulted in a long chew time for the finished dog treat.

Example 3

Short dried penis stick pieces were ground into a fine powder and a coating utilizing the ground fraction is formulated. The bull penis end pieces were first ground through a 30 H.P Prater hammer mill and then tumbled for 36 hours in a Norton Ball Mill to achieve a fine powder. This powder was then sieved to isolate a dry powder fraction that passed 100% through a 150 mesh screen. This bully powder was then incorporated into a coating base composed of the following:

| Ingredient | % |
|---|---|
| Beef Liver | 50.0 |
| Liquid Egg | 21.0 |
| 62 DE Corn Syrup | 20.0 |
| Dried Bull Penis Powder | 8.35 |
| Tween 60 | 0.20 |
| Carmel Color | 0.15 |
| CMC 7HF Cellulose Gum | 0.20 |
| Tocopherol | 0.10 |

The beef liver was emulsified in a bowl chopped and placed in a Hobart blender. The liquid egg and warmed corn syrup was added. The remaining ingredients were added under agitation. The final viscosity was adjusted to 3,500 centipoise units with the addition of 0.2% CMC cellulose gum. Dried and bleached beef rib bones were submerged in the coating solution and the ribs were passed thru a conveyor dryer operated at 375° F. for a retention time of 3.5 min to heat-set and dry the rib bones. The final dried product had excellent palatability and had a coating of bully flavored coating representing 6.5% of the total rib weight. This product was highly palatable to dogs.

It is to be understood that while the invention has been described in conjunction with the above embodiments, that the foregoing description and examples are intended to illustrate and not limit the scope of the invention. Other aspects, advantages and modifications within the scope of the invention will be apparent to those skilled in the art to which the invention pertains.

What is claimed is:

1. A pet chew comprising a chewable substrate coated with a palatable coating, wherein the chewable substrate is selected form the group consisting of bones, horns, antlers and hooves obtained from animals.

2. The pet chew of claim 1, wherein the bones comprise femur bones, rib bones, or knuckle bones obtained from a bovine animal.

3. The pet chew of claim 1, wherein the femur bones are bleached.

4. A method of making a coated pet chew or coated pet food, the method comprising contacting a chewable substrate with a palatable coating composition and drying the coated pet chew or pet food; wherein the chewable substrate is selected from the group consisting of dried femur bones, beef knuckle bones, cattle horns, deer antler, elk antler and cow hooves, and wherein the palatable coating composition comprises hull penis fraction and one or more food grade additives selected from thickening agents, heat setting agents, adhesion agents, vitamins, emulsifiers, binding agents, antioxidants, palatability enhancers, nutritional aids or mixtures thereof.

5. The method of claim 4, wherein the palatable coating composition comprises about 5% to about 40% by weight of bull penis fraction, about 20% to about 60% by weight of beef liver, about 15% to about 25% by weight of corn syrup, and about 15% to about 25% by weight of liquid egg.

6. The method of claim 5, wherein the bull penis fraction comprises dried bull penis powder or emulsified bull penis.

7. The method of claim 4, wherein the palatable coating composition comprises about 2% to about 15% by weight of bully digest, about 40% to about 70% by weight of beef liver, about 15% to about 25% by weight of corn syrup, and about 5% to about 15% by weight of whole egg powder;

wherein the bully digest comprises enzymatically treated bull penis fraction.

\* \* \* \* \*